(12) United States Patent
Lin et al.

(10) Patent No.: US 12,189,049 B2
(45) Date of Patent: Jan. 7, 2025

(54) DATA EFFICIENT LEARNING AND RAPID DOMAIN ADAPTATION FOR WIRELESS POSITIONING AND TRACKING

(71) Applicant: QUALCOMM Incorporated, San Diego, CA (US)

(72) Inventors: Jamie Menjay Lin, San Diego, CA (US); Nojun Kwak, San Diego, CA (US); Fatih Murat Porikli, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 176 days.

(21) Appl. No.: 17/461,516

(22) Filed: Aug. 30, 2021

(65) Prior Publication Data

US 2022/0065981 A1    Mar. 3, 2022

Related U.S. Application Data

(60) Provisional application No. 63/072,704, filed on Aug. 31, 2020.

(51) Int. Cl.
*G01S 5/02* (2010.01)
*G06N 20/00* (2019.01)
*H04W 4/029* (2018.01)

(52) U.S. Cl.
CPC .......... *G01S 5/0269* (2020.05); *G01S 5/021* (2013.01); *G06N 20/00* (2019.01); *H04W 4/029* (2018.02)

(58) Field of Classification Search
CPC ....... G01S 5/0269; G01S 5/021; G06N 20/00; G06N 3/045; G06N 20/20; G06N 3/098; H04W 4/029
See application file for complete search history.

(56) References Cited

U.S. PATENT DOCUMENTS 10,655,971 B1 * 5/2020 Huberman ............. G06N 3/044
10,705,178 B2    7/2020 Baxley et al.

FOREIGN PATENT DOCUMENTS

KR    20150082390 A  *  7/2015
WO    WO-2020061008 A1 * 3/2020    ............... G06N 3/04

OTHER PUBLICATIONS

Kanazawa Noboru et al: "Field Experiment of Localization Based on Machine Learning in LTE Network", 2018 IEEE 88th Vehicular Technology Conference (VTCFALL), IEEE, Aug. 27, 2018 (Aug. 27, 2018), pp. 1-6, XP033535488 (Year: 2018).*
International Search Report and Written Opinion—PCT/US2021/048541—ISA/EPO—dated Jan. 18, 2022.

(Continued)

*Primary Examiner* — Umair Ahsan
(74) *Attorney, Agent, or Firm* — Patterson + Sheridan, LLP

(57) ABSTRACT

Certain aspects of the present disclosure provide techniques for machine learning using basis decomposition, comprising receiving a first runtime record, where the first runtime record includes RF signal data collected in a physical space; processing the first runtime record using a plurality of basis machine learning (ML) models to generate a plurality of inferences; aggregating the plurality of inferences to generate a prediction comprising a plurality of coordinates; and outputting the prediction, where the plurality of coordinates indicate a location of a physical element in a physical space.

30 Claims, 9 Drawing Sheets

(56) References Cited

OTHER PUBLICATIONS

Luis C.V.J., et al., "Room Recognition Using Discriminative Ensemble Learning with Hidden Markov Models for Smart phones", 2018 IEEE 29th Annual International Symposium on Personal, Indoor and Mobile Radio Communications (PIMRC), IEEE, Sep. 9, 2018 (Sep. 9, 2018), pp. 1-7, XP033479418, DOI: 10.1109/PIMRC.2018.8580775, [Retrieved on Dec. 18, 2018], Abstract, figure 1 p. 1, col. 1, line 1-p. 2, col. 1, line 38.

Noboru K., et al., "Field Experiment of Localization Based on Machine Learning in LTE Network", 2018 IEEE 88th Vehicular Technology Conference (VTC-FALL), IEEE, Aug. 27, 2018 (Aug. 27, 2018), pp. 1-6, XP033535488, DOI: 10.1109/VTCFALL.2018.8690868, [Retrieved on Apr. 12, 2019], Abstract, Figures 1, 2 p. 2, col. 1, line 35-p. 4, col. 2, line 25.

\* cited by examiner

DATA EFFICIENT LEARNING AND RAPID DOMAIN ADAPTATION FOR WIRELESS POSITIONING AND TRACKING

CROSS-REFERENCE TO RELATED APPLICATIONS

This application claims the benefit of and priority to U.S. Provisional Patent Application No. 63/072,704, filed Aug. 31, 2020, the entire contents of which is incorporated herein by reference in its entirety.

INTRODUCTION

Aspects of the present disclosure relate to machine learning, and in particular to efficient machine learning and domain adaptation.

Wireless perception and positioning have become increasingly prevalent in a variety of industries. For example, indoor positioning of objects (such as people, other mobile entities, and the like) is being actively developed for its wide range of consumer and business applications. However, wireless positioning (particularly indoor positioning) has also proven to be a challenging problem, especially with respect to the high dimensions and complexities in modeling multipath signals within an indoor environment. Moreover, even if a particular environment has been adequately modeled, minor changes (such as a simple move of one piece of furniture) can drastically impact the accuracy of subsequent inferences in conventional systems.

Furthermore, when applying deep learning to wireless positioning, data collection can present another set of challenges. Traditional machine learning models require significant training data in order to function accurately. In addition to significant amounts of data, existing techniques rely on a wide diversity of training data and labels (e.g., high density sampling) to adequately solve the wireless positioning problem. Further, to respond to changes in the environment, the models require frequent updated data from the new environment. In many realistic deployments, this high data requirement significantly reduces the accuracy and adaptability of the models, or prohibits adaptation entirely.

BRIEF SUMMARY

Certain embodiments provide a method to train machine learning models, comprising: receiving a set of training records, each associated with a respective label comprising respective values for a plurality of output dimensions; decomposing each training record in the set of training records based on the plurality of output dimensions; and training a plurality of decomposed machine learning (ML) models based on the decomposed training records, comprising, for each respective output dimension of the plurality of output dimensions: determining, for a first training record, a respective dimension-specific value with respect to the respective output dimension based on a label of the first training record; and applying the respective dimension-specific value to generate a respective loss for a respective decomposed ML model of the plurality of decomposed ML models, wherein the respective decomposed ML model is specific to the respective output dimension.

Certain embodiments provide a method to train machine learning models, comprising: receiving a first runtime record, wherein the first runtime record includes RF data collected in a physical space; and processing the first runtime record using a plurality of decomposed ML models to generate a plurality of inferences; and aggregating the plurality of inferences to generate a plurality of coordinates, wherein the plurality of coordinates indicate a location of a physical element in a physical space.

Further embodiments relate to apparatuses configured to perform the methods described herein as well as non-transitory computer-readable mediums comprising computer-executable instructions that, when executed by a processor of a device, cause the device to perform the methods described herein.

The following description and the related drawings set forth in detail certain illustrative features of one or more embodiments.

BRIEF DESCRIPTION OF THE DRAWINGS

The appended figures depict certain aspects of the one or more embodiments and are therefore not to be considered limiting of the scope of this disclosure.

To facilitate understanding, identical reference numerals have been used, where possible, to designate identical elements that are common to the drawings. It is contemplated that elements and features of one embodiment may be beneficially incorporated in other embodiments without further recitation.

DETAILED DESCRIPTION

Figure 1A:
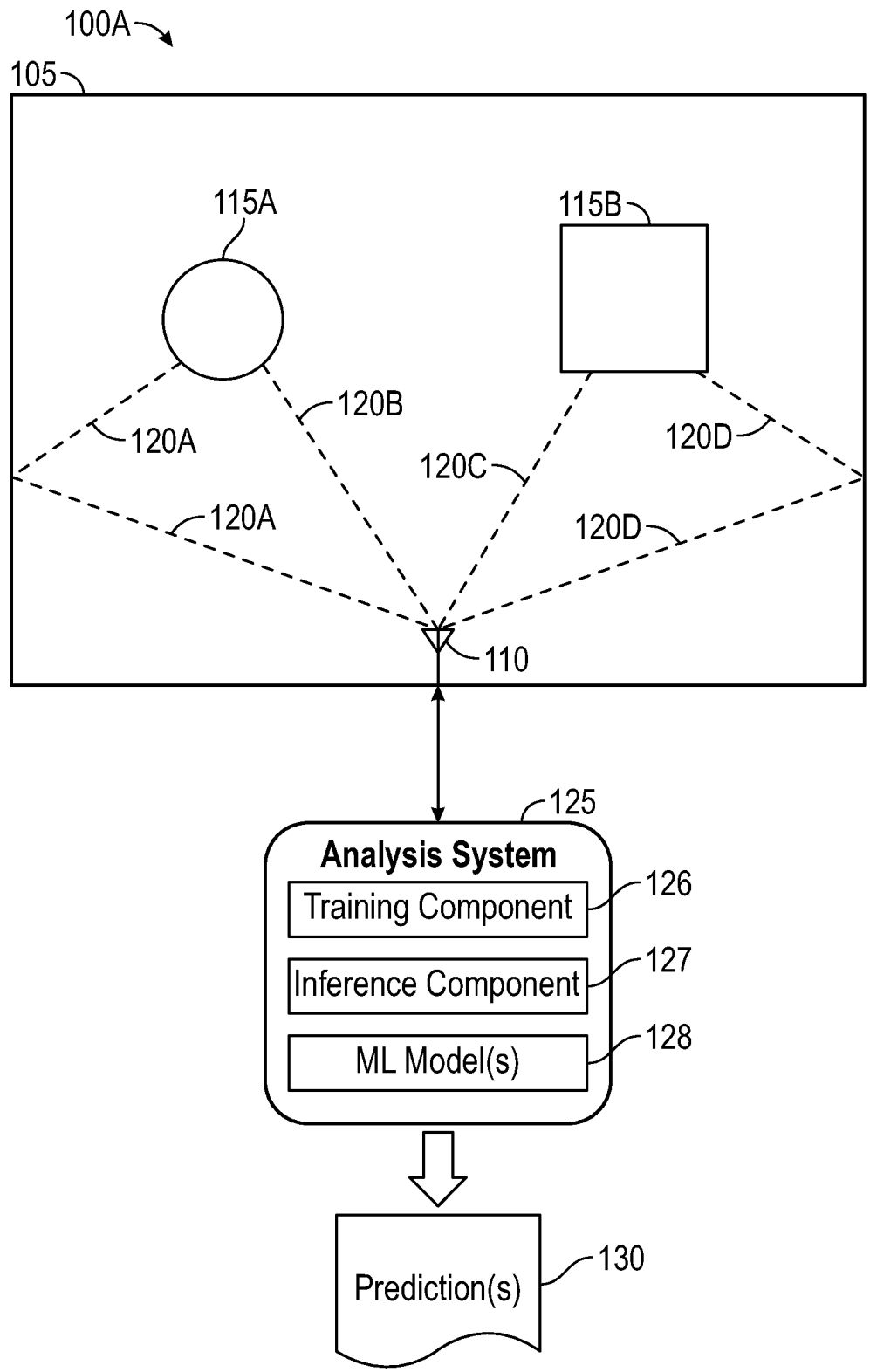
FIGS. 1A and 1B depict environments including analysis systems configured to provide efficient machine learning, according to some embodiments disclosed herein.

Aspects of the present disclosure provide apparatuses, methods, processing systems, and computer-readable mediums for model decomposition to improve learning efficiency and to reduce data needs.

In some embodiments of the present disclosure, basis decomposition is used for model features and losses in order to enable machine learning (ML) with sparse data coverage. As used herein, basis decomposition (also referred to as domain decomposition in some embodiments) generally involves decomposing a computational problem into discrete components in order to improve the solution process. Specifically, in embodiments of the present disclosure, multidimensional models, which can be vastly complex, are decomposed into a set of unidimensional models. Wireless positioning is used herein as an example use for such models, but embodiments of the present disclosure are readily-applicable to any number and variety of uses.

Wireless positioning and tracking generally involves analysis of signal characteristics to predict or estimate the location or movement of objects (such as people, as well as other mobile, motile, locomotive, or otherwise itinerant entities) in a physical space. Signal characteristics may generally include, without limitation, signal strength, phase (s) of the signals, carrier-frequency offsets of the signal(s), signal-to-noise ratio(s) of the signal(s), variance(s) of the signal(s), mean(s) of the signal(s), bandwidth of the signal (s), peak-to-average ratio(s) of the signal(s), or subcarrier(s) of the signal(s). Machine learning models may be trained to analyze signal characteristics and to output predicted locations of positioning targets (e.g., objects such as people). In some embodiments, the output of such models is multi-dimensional (e.g., a set of coordinates) indicating the location and/or movement (e.g., defined by a motion vector) of positioning targets in the space, including humans, vehicles, and the like.

Labeled training data may generally be used to train machine learning models. Typically, the label (e.g., coordinates of the positioning target(s) in the space) are used to compute losses and iteratively refine the model using large amounts of training data. Conventionally, machine learning models are trained on all dimensions simultaneously, which substantially increases model complexity and training data requirements. Such complexity and significant data requirements make initial training (and any subsequent retraining) of the model computationally costly and time consuming, which is not well-suited to modeling environments in which retraining is frequent. For example, dynamic indoor environments (e.g., where chairs or other furniture may be moved) may necessitate frequent retraining of indoor positioning models.

In some embodiments, to improve the functionality of the system, basis decomposition is applied to train an independent model (or a portion thereof) for each individual output dimension. For example, a basis decomposition of a three-dimensional spatial model may include basis models for each of the individual dimensions: x, y, and z. Basis decomposition beneficially allows the model to generalize well even with minimal training data, which improves inference accuracy (also referred to as prediction accuracy). Further, this decomposition training requires less training data, and allows the models to be trained and adapted to changing environments more rapidly than existing techniques provide. In embodiments of the present disclosure, basis decomposition is applied to the models, loss, error, and inferences (or any subset thereof) to significantly reduce data requirements and improve adaptability of the models.

In one embodiment, given a solution (output) space of K dimensions, a machine learning model M is decomposed to a set of models $[M_0, M_1, \ldots, M_{K-1}]$. Similarly, loss L may be decomposed into a set of losses $[L_0, L_1, \ldots, L_{K-1}]$, error E may be decomposed into a set of errors $[E_0, E_1, \ldots, E_{K-1}]$, and the inferences I may be decomposed into a set of inferences $[I_0, I_1, \ldots, I_{K-1}]$. In this way, the system can train on each dimension k individually, significantly reducing computational overhead and data requirements. To generate a new inference, the system can apply the input data to each dimension-specific model, and generate an overall estimate by aggregating the resulting dimension-specific inferences.

In embodiments, by utilizing basis decomposition, the system is able to significantly improve over existing approaches in a variety of ways. For example, training and inferencing using the decomposed models is more computationally efficient than existing systems, as the complexity of the model is reduced. Because the models are trained on a dimension-specific basis, their time and space complexity, as well as the amount of training data required, is significantly reduced. For example, while traditional models require $O(N^3)$ memory space (as well as high computational time) for three-dimensional coordinates and $O(N^2)$ for two-dimensional coordinates, embodiments of the present disclosure can provide accurate and multi-dimensional inferences in $O(N)$ memory space (with accompanying reduced computational time). That is, by training on each dimension independently, the system can effectively treat positioning as a set of linear problems (solved using linear models), as opposed to an exponential problem corresponding to the number of dimensions.

Further, the storage requirements for the models is reduced, as the models themselves may be smaller than the multidimensional models used by existing systems. Moreover, the time required to train the models is reduced significantly, due to the reduced complexity and data needs. Relatedly, because less training data is required, storage requirements, computational resources, manual effort, and time required to prepare the models are all reduced. Furthermore, because complexity and storage requirements are reduced, the power consumption needed to train and use the decomposed models is reduced.

Example Environments Utilizing Improved Positioning Through Machine Learning

Figure 1B:
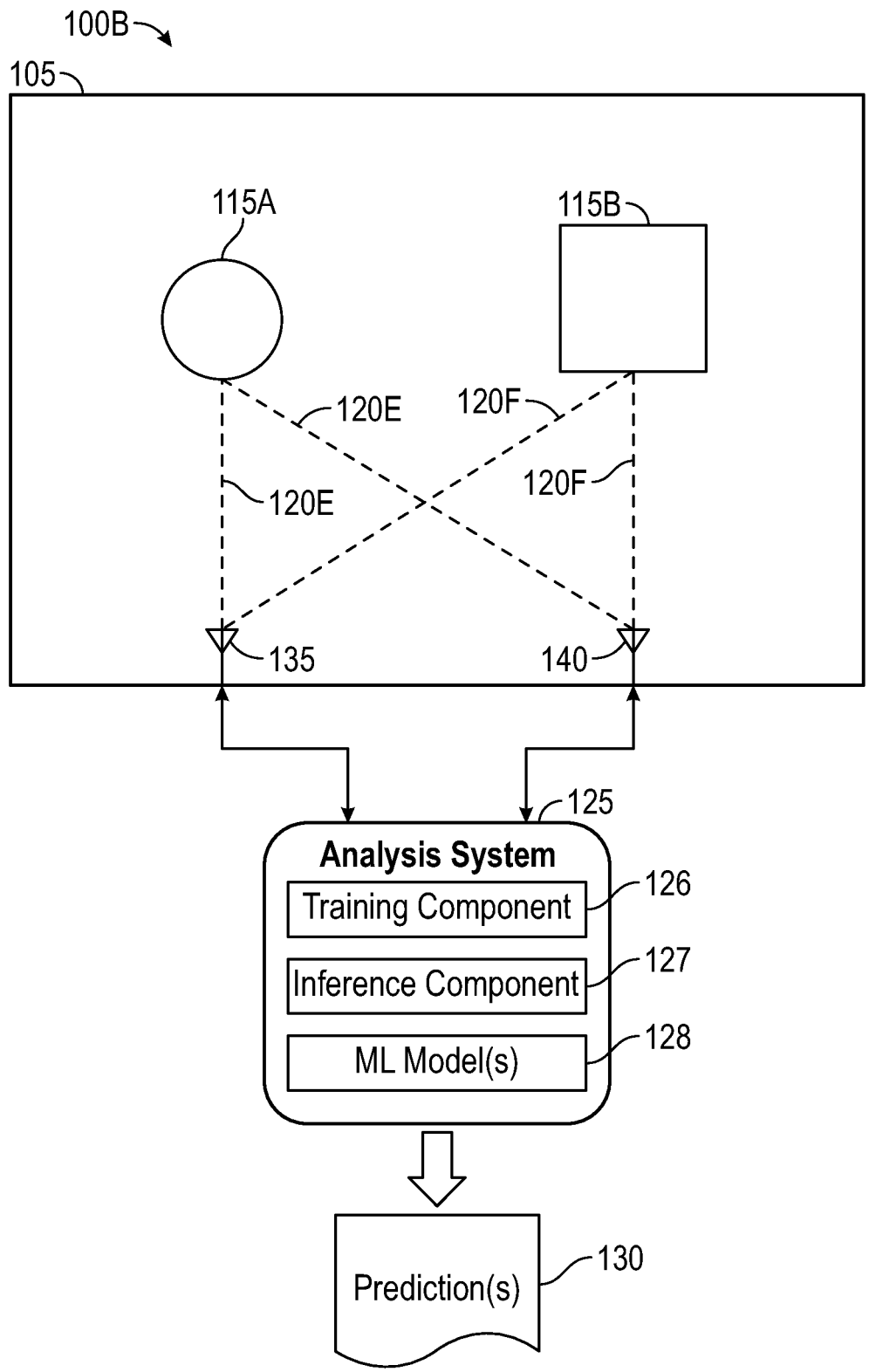

FIGS. 1A and 1B depict environments including analysis systems configured to provide efficient machine learning for wireless positioning and tracking using basis decomposition, according to some embodiments disclosed herein.

In FIG. 1A, the environment 100A includes a physical space 105 with a set of positioning targets 115A-B and transceiver 110. As illustrated, the transceiver 110 is configured to transmit and receive signals in the physical space 105. The transceiver 110 may be a dedicated device (e.g., installed in order to provide wireless positioning), or may be a multi-use device (e.g., an access point installed to provide wireless connectivity, but which can also be used to provide wireless positioning).

As illustrated, the transceiver 110 can transmit signals 120A-D in the physical space 105, which interact with various elements (e.g., reflecting and refracting off them, being attenuated by them, etc.) in the space before returning to the transceiver 110. Such elements may generally include fixtures (e.g., buildings, walls, ceilings, floors, pillars, and the like), static but moveable objects (e.g., tables, chairs, other furniture, doors, laptops, and the like), as well as moving positioning targets (e.g., humans, animals, vehicles, and the like). In an embodiment, as the positioning targets 115 move in the space, the characteristics of the signals 120 change, allowing the positioning targets 115 to be located/positioned (and, in some embodiments, enabling generation of a movement or direction vector indicating the movement of the positioning targets).

Generally, when a static but moveable object (which may be referred to as semi-static) changes position in the space (e.g., when desks or chairs are rearranged), the RF environment can also shift as the resulting signal reflections, refractions, and attenuation change. In conventional systems, these changes typically require collection of vast amounts of updated training data to refine or retrain the positioning models. In contrast, using embodiments of the present disclosure, the models can continue to provide accurate positioning even when the environment changes. Further, because the basis decomposition requires less training data to function accurately, the models can be adapted more quickly, using relatively little updated training data, as compared to conventional systems.

In the illustrated example, the transceiver 110 generally collects, determines, and provides characteristics about the signals 120 to an analysis system 125. In other embodiments, the transceiver 110 may provide captured raw signals to an intermediate system (or to the analysis system 125), which can then determine the various characteristics. These characteristics generally reflect the composite results of multipath fading, reflection, scattering, and attenuation in the physical space 105 between signal transmission and reception by transceiver 110. In various embodiments, the signal characteristics may include, for example, the signal strength, the phase(s) of the signals, the carrier-frequency offsets of the signal(s), the signal-to-noise ratio(s) of the signal(s), the variance(s) of the signal(s), the mean(s) of the signal(s), the bandwidth of the signal(s), the peak-to-average ratio(s) of the signal(s), the subcarrier(s) of the signal(s), and others.

In an embodiment, the positioning targets are entirely passive. That is, the signals 120 need not be received by a device, and devices need not transmit response signals. Instead, the analysis system 125 analyzes the signal characteristics (caused by reflection, refraction, attenuation, and the like). This allows the analysis system 125 to locate and track passive positioning targets such as humans, animals, vehicles, and the like. Although an indoor physical space 105 is depicted, the analysis system 125 may be utilized in conjunction with any type of environment (including outdoor spaces).

In the illustrated embodiment of FIG. 1A, the signals 120 may take any number of paths while reflecting or refracting in the physical space 105. For example, some (e.g., signals 120B and 120C) may reflect or refract directly off the positioning targets 115A and 115B before returning to the transceiver 110. Others (e.g., signals 120A and 120D) may reflect or refract off one or more other elements (such as the walls in the room, or semi-static objects such as desks and chairs) before or after bouncing or refracting off the positioning targets 115A and 115B and returning to the transceiver 110. Of course, many signals may reflect, refract, or attenuate in such a way that they never return to the transceiver 110. Note that the example signal paths 120A-D in FIG. 1A are simplified for ease of discussion and other more complex paths, dispersion patterns, etc. are possible.

In the illustrated embodiment of FIG. 1A, based on the signal characteristics of any received signals (e.g., signals received by the transceiver 110), the analysis system 125 generates one or more predictions 130 (also referred to as inferences in some embodiments) relating to the positions and/or movement of the positioning targets 115 in the physical space 105. To do so, in the illustrated embodiment, the analysis system 125 utilizes a training component 126, an inference component 127, and a set of one or more trained ML models 128. Although depicted as discrete components within the analysis system 125 for conceptual clarity, in embodiments, the training component 126, inference component 127, and ML models 128 may be distributed across any number of components and devices.

Generally, the training component 126 uses the received signal characteristics to train a set of ML models 128, with at least one model being trained for each dimension in the solution space (e.g., for each dimension in the physical space 105 that positioning targets can move in). At runtime, the inference component 127 can provide signal characteristics to each of the ML models 128 to generate the predictions 130.

In some embodiments, each prediction 130 is an n-tuple set of coordinates indicating the location of one or more positioning targets 115, where n is the number of relevant dimensions. For example, in a Cartesian coordinate system, the predictions 130 may be (x, y) or (x, y, z) coordinates of each positioning target. In a polar coordinate system, the predictions 130 may each indicate the angle and range of the positioning targets 115 (e.g., relative to the transceiver 110). In some embodiments, the analysis system 125 can generally provide location predictions, motion vectors, or both, relative to any reference coordinate system. That is, though a receiver-centric or transceiver-centric coordinate system is described in some examples, the particular reference system can vary depending on the particular implementation. By generating a sequence of such n-tuples at different times (based on the signal characteristics are different times), the movement of positioning targets over time can be quantified and tracked.

In the illustrated example of FIG. 1A, each respective ML model 128 may be trained to process the input data (e.g., signal characteristics) and output a value for a respective dimension in the physical space 105. For example, for a two-dimensional Cartesian coordinate system, the analysis system 125 may use a first model to output coordinates for one dimension (e.g., the x dimension) while a second model outputs coordinates for the other dimension (e.g., the y dimension). Of course, any number of output dimensions may be utilized in various embodiments, depending on the particular implementation.

The dimension-specific models can be similarly trained in a dimension-specific manner. For example, in a system with dimensionality K, a separate model $M_k$, k∈K can be trained for each dimension. To do so, in one embodiment, the analysis system 125 (e.g., the training component 126) can provide the input data as input to each ML model 128 to generate a set of dimension-specific inferences. Each inference is then used to compute a set of dimension-specific losses/errors, and each dimension-specific error is used to refine the corresponding dimension-specific ML model 128 (e.g., via backpropagation).

In FIG. 1B, the environment 100B includes the physical space 105 with a set of positioning targets 115A-B. Notably, in the illustrated embodiment, the system includes a discrete transmitter 135 and receiver 140. As illustrated, the transmitter 135 is configured to transmit signals in the physical space 105. These signals can reflect or otherwise interact with the positioning targets 115 (as well as other objects, such as walls and furniture), as discussed above, and be received by the receiver 140. In the illustrated embodiment, the transmitter 135 and receiver 140 are communicatively coupled with the analysis system 125. Thus, in the environment 100B, separate components may transmit and receive the signals 120E-F.

Additionally, although a single pair of components (one transmitter 135 and one receiver 140) are illustrated, in various embodiments, the system may include any number and variety of transceivers 110, transmitters 135, and receivers 140. In some embodiments, the various transceivers and transmitters may communicate in a mesh network architecture.

Example Workflow for Improved Machine Learning Using Decomposition

Figure 2:
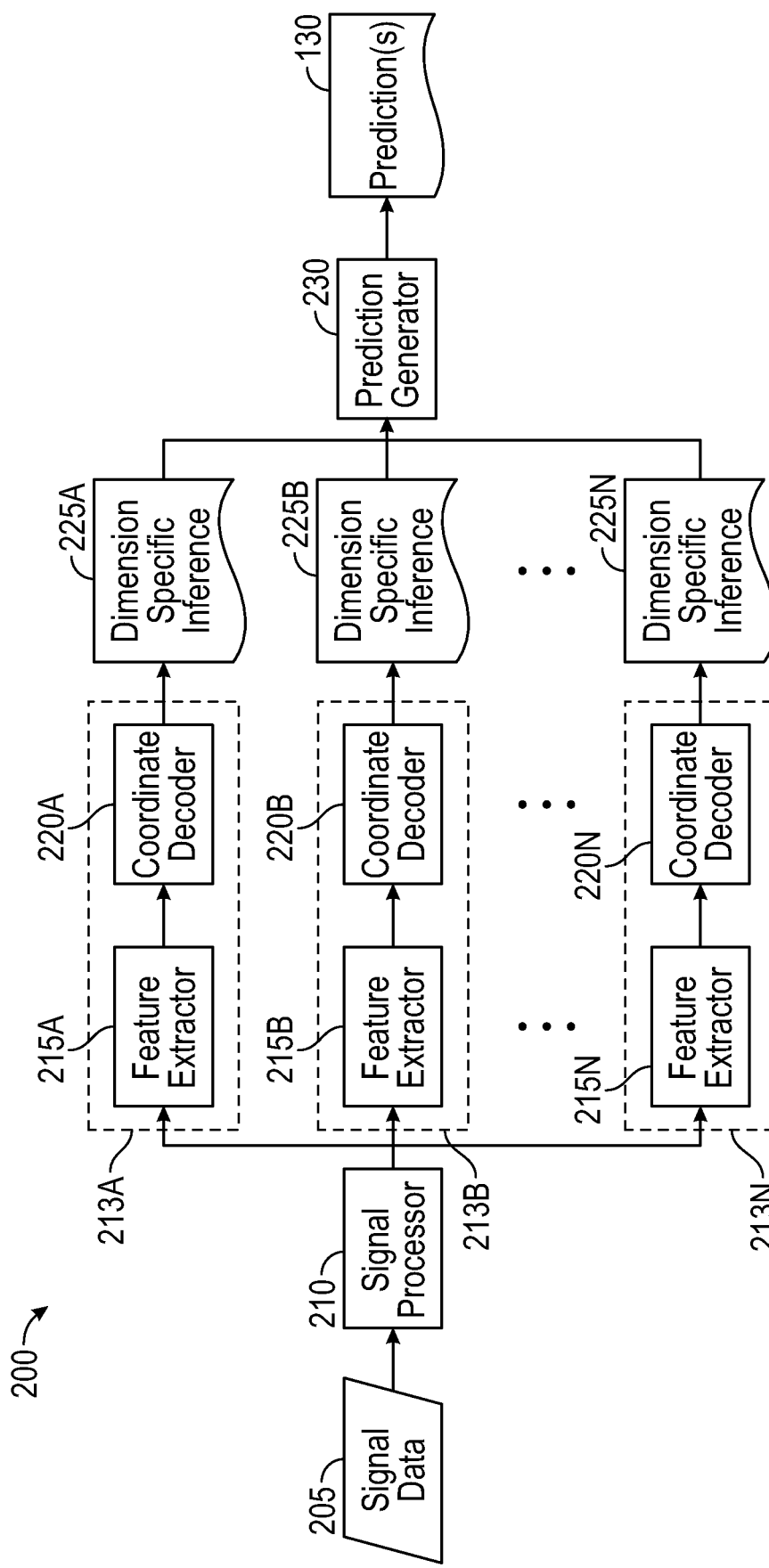
FIG. 2 depicts a workflow for data decomposition and evaluation using dimension-specific models, according to some embodiments disclosed herein.

FIG. 2 depicts a workflow 200 for data decomposition and evaluation using dimension-specific models, according to some embodiments disclosed herein. In the illustrated workflow 200, signal data 205 is received and processed by a signal processor 210. In embodiments, the signal data 205 generally includes the characteristics of one or more radio frequency (RF) signals collected in a physical space at a given time. This may include the received signal strength (RSSI), phases of the signal(s), signal-to-noise ratio(s), carrier-frequency offsets, bandwidth, peak-to-average ratios, variances, and the like. These characteristics generally reflect the results of multipath fading, reflection, scattering, and attenuation as RF signals traverse a physical space (potentially reflecting off and/or refracting through positioning targets or other objects in the space). In embodiments, the space can include any environment, including indoor spaces (such as offices, conference centers, warehouses, and the like) or outdoor spaces (such as outdoor shopping malls, stadiums, streets, and the like).

In embodiments, the signal processor 210 may generally perform any pre-processing on the signal data 205, such as noise or outlier removal, data smoothing, and the like. In the illustrated embodiment, the input signal data 205 is then passed to a set of models 213A-N. In one embodiment, each respective model 213 is a basis model specific to a respective output dimension of the system. For example, if the system outputs two-dimensional coordinates, the workflow 200 may utilize two models 213. If the system outputs three-dimensional coordinates, three models 213 may be utilized. More generally, in some embodiments, where there are K output dimensions, there may be K independent basis models 213.

Although the illustrated embodiment depicts discrete dimension-specific models 213A-N, in some embodiments, some portion of the models may be shared across dimensions. That is, for K output dimensions, there may be fewer than K independent models 213. Such embodiments may be referred to as partially decomposed models.

For example, to perform feature extraction on the input signal data 205, there may be significant portions of sharable or common layers or operations that can be used by multiple models 213. In at least one embodiment, for K output dimensions, there are exactly K components or models at least at the end of the workflow 200 (e.g., just before the final output component(s)), in order to produce K individual inferences. That is, some initial processing (such as feature extraction) may be shared, while a discrete and dimension-specific component is used to generate the final inference for each discrete output dimension.

In the illustrated workflow 200, each respective model 213A-N includes a respective feature extractor 215 and a respective coordinate decoder 220, and yields a respective dimension-specific inference 225.

Each feature extractor 215A-N receives the input signal data 205 and performs feature extraction to identify salient or relevant features based on prior training. In an embodiment, the signal data 205 may be received via one or more receivers and/or transceivers (such as the transceiver 110 and the receiver 140). The feature extractors 215A-N may generally correspond to software components, hardware components, or a combination of hardware and software. In some embodiments, the feature extractors 215A-N correspond to one or more neurons or layers in a neural network or deep neural network.

The input signal data 205 provided to each model 213A-N is not decomposed or divided, and each feature extractor 215A-N receives the entire set of data. That is, although each feature extractor 215A-N may be trained to identify features for a specific dimension, each operates on the entirety of the signal data 205 and is not restricted to any subset thereof.

In some embodiments using separate feature extraction (as opposed to shared feature extraction), each respective feature extractor 215A-N is trained for a respective output dimension in order to extract features relevant to the corresponding output dimension.

As illustrated, each model 213A-N additionally includes a respective coordinate decoder 220. These coordinate decoders 220 may be implemented using hardware, software, or a combination thereof. In some embodiments, the coordinate decoders 220 correspond to one or more layers or neurons in a neural network or deep neural network.

Each coordinate decoder 220A-N receives the extracted features from its corresponding feature extractor 215A-N and processes it to generate a corresponding dimension-specific inference 225A-N. In some embodiments, each coordinate decoder 220A-N is trained using machine learning to generate one or more predicted coordinates, given signal data 205 and/or extracted features.

For example, in a three-dimensional Cartesian system, the dimension-specific inference 225A generated by the coordinate decoder 220A may be a predicted value for a first dimension (e.g., a value on the x axis), while the dimension-specific inference 225B generated by the coordinate decoder 220B is a predicted value for a second dimension (e.g., a value along the y axis) and the dimension-specific inference 225N generated by the coordinate decoder 220N is a predicted value for a third dimension (e.g., a value along the z axis).

That is, the dimension-specific inference 225A may indicate the location of one or more positioning targets horizontally in a physical space (e.g., to the left or right of the sensor), while dimension-specific inference 225B indicates the location of the positioning target(s) in the depth of the space (e.g., toward and away from the sensor) and dimension-specific inference 225N indicates the positioning target(s) vertical position(s) (e.g., between a floor and a ceiling).

In the illustrated workflow 200, each dimension-specific inference 225 is provided to a prediction generator 230 that generates an overall prediction 130 based on each inference. In some embodiments, by iteratively generating predictions 130 at sequential moments in time (using sequential sets of signal data 205), the system can generate a movement or motion vector indicating the motion of the positioning targets in the space.

In some embodiments, the prediction generator 230 simply concatenates the individual dimension-specific inferences 225A-N to generate the overall prediction 130. For example, if each dimension-specific inference 225 is a value for a given dimension/axis, the prediction generator 230 may concatenate them to generate a tuple (e.g., (x, y, z)) as the prediction 130 for the location(s) of one or more positioning targets at the given moment in time corresponding to the signal data 205.

In other embodiments, the prediction generator 230 may perform a more complex aggregation or fusion of the features (e.g., the dimension-specific inferences 225A-N) to generate the prediction 130. For example, the prediction generator 230 may perform element-wise summation, upsampling or downsampling certain feature components followed by concatenation or summation with other components, convolution and/or other operations (e.g., to introduce nonlinearity) of certain feature components followed by concatenation or summation with other optionally convoluted feature components, and the like.

Example Neural Network for Improved Predictions Using Decomposition

Figure 3:
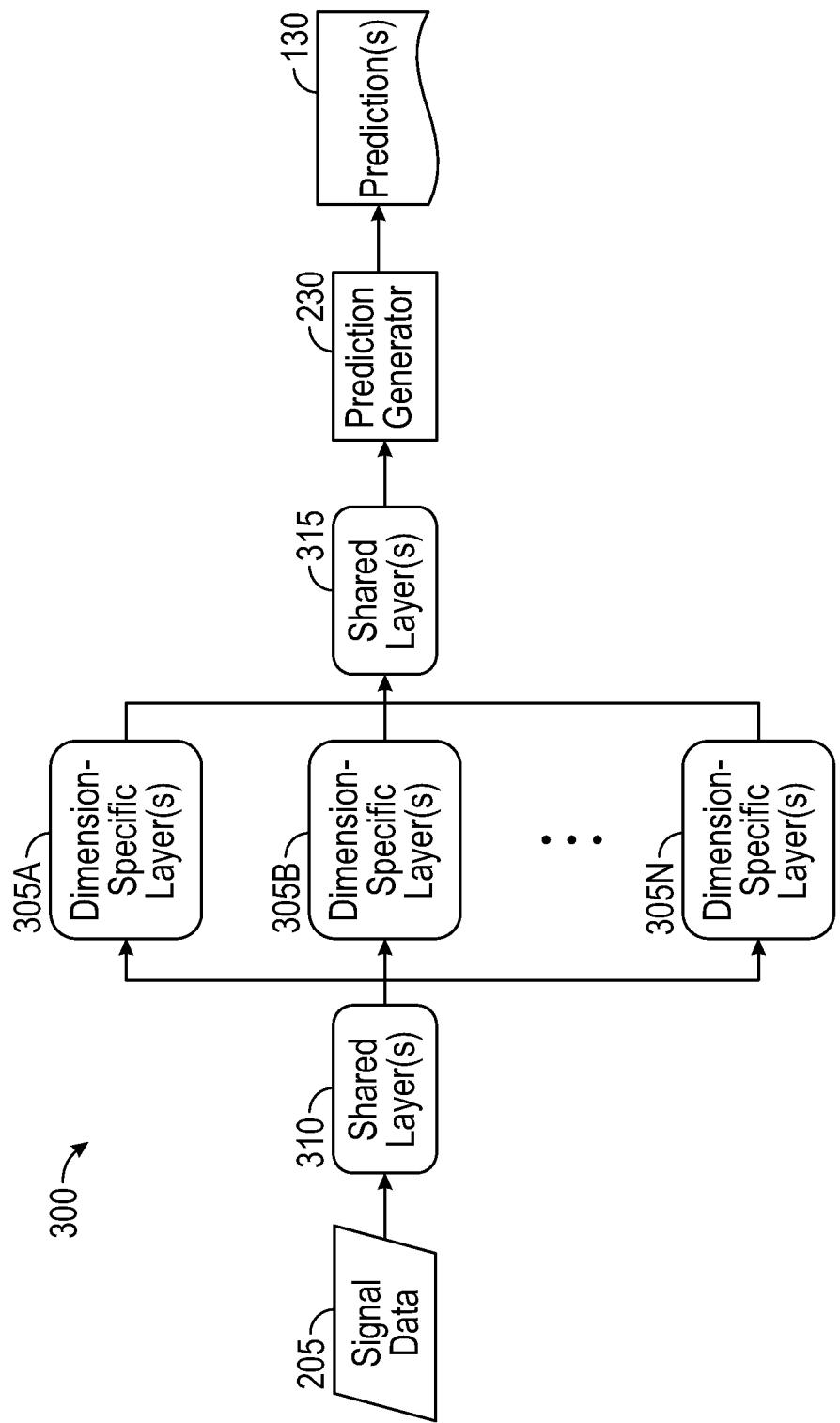
FIG. 3 depicts a neural network configured to evaluate data using dimension-specific layers, according to some embodiments disclosed herein.

FIG. 3 depicts a neural network 300 configured to evaluate data using dimension-specific layers, according to some embodiments disclosed herein. In the illustrated embodiment, signal data 205 is received and processed using one or more shared layers 310 in the neural network 300. For example, these shared layers 310 may correspond to feature extraction. That is, the shared layers 310 may replace and perform the operations of the dimension-specific feature extractors 215A-N in FIG. 2.

The output of the shared layers 310 is provided as input to a set of dimension-specific layers 305A-N. In an embodiment, each dimension-specific layer 305 is trained for a respective dimension in the output predictions.

In the illustrated embodiment, the neural network 300 further includes one or more additional shared layers 315 after the dimension-specific layers 305A-N. For example, the shared layers 315 may be attention modules, transformer modules, or may be utilized to provide convolution, upsampling or downsampling, batch normalization, nonlinearity, and the like. In some embodiments, the shared layers 315 operate on output from the dimension-specific layers 305A-N jointly. That is, the output of the dimension-specific layers 305A-N may be aggregated and processed by the shared layers 315.

In other embodiments, the shared layers 315 may operate separately on the output from each dimension-specific layer 305A-N. That is, the output from each dimension-specific layer 305A-N may be processed by the shared layers 315 separately from the output from the other dimension-specific layers 305A-N, and the results may be provided to the prediction generator 230. For example, multiple instances of the shared layers 315 (with identical parameters and weights) may be utilized, one for each dimension. The prediction generator 230 then aggregates the individual dimension-specific inferences to generate one or more predictions 130.

Example Method for Training Machine Learning Models Using Decomposition

Figure 4:
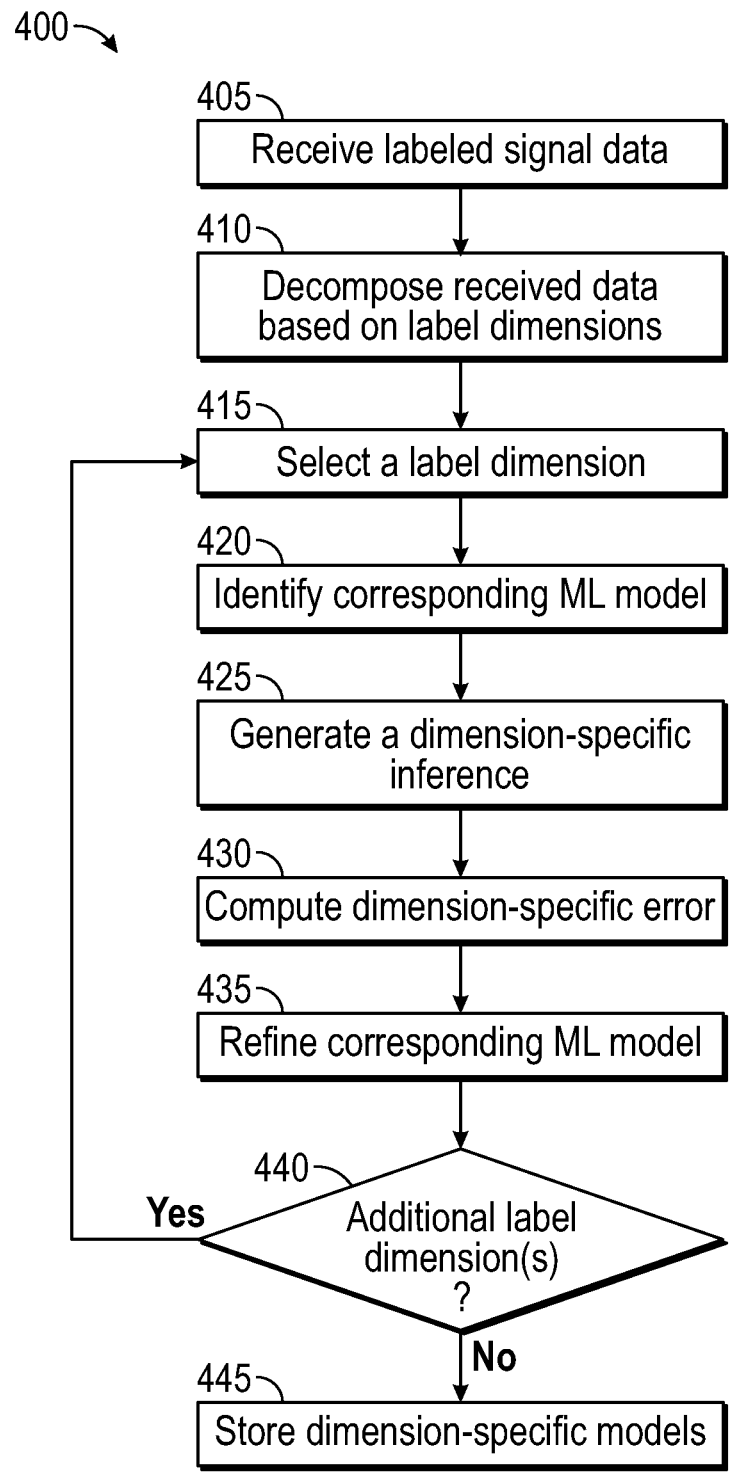
FIG. 4 depicts a flow diagram illustrating a method for training machine learning models using basis decomposition, according to some embodiments disclosed herein.

FIG. 4 depicts a flow diagram illustrating a method 400 for training or refining machine learning models using basis decomposition, according to some embodiments disclosed herein. The method 400 may be performed by an analysis system (e.g., analysis system 125 of FIGS. 1A and 1B). The method 400 begins at block 405, where labeled signal data is received by the analysis system.

In embodiments, the signal data corresponds to physical characteristics of one or more signals (e.g., RF signals) in a space. The labels associated with the signal data indicate the physical position and/or movement of one or more positioning targets in the space. For example, the signal data may be delineated into individual records (e.g., at specific moments or intervals in time), where the corresponding label for each record indicates the location(s) of one or more positioning targets during the moment or interval. In such an example, the sequence of records over time can indicate the movement of the positioning target over time. In other embodiments, each label may additionally include movement data such as speed or heading (e.g., collected based on Doppler shift in the signals). By training using the labeled data, the models learn to predict positioning target location(s) and/or movement at any given time or interval, when provided with signal data collected at the given time or interval.

In some embodiments, the labeled signal data is collected with the assistance of one or more other components or users. For example, in one embodiment, a user can move throughout the space, indicating her current location at various intervals (e.g., using a smartphone). The analysis system can use these indications to label the signal data corresponding to the moment when the indication was received. This allows the analysis system to iteratively build a set of training data. In various other embodiments, the analysis system may use alternative approaches to label the data. For example, the system may utilize one or more cameras to capture images of the space. These images can then be analyzed to identify the location of the user or positioning target in each image (e.g., based on the pixel(s) that include the positioning target, or using other models to interpret the video) in order to generate appropriate labels.

In at least one embodiment, the analysis system can utilize relatively sparse training records by using basis decomposition to perform training. That is, while traditional machine learning requires vast amounts of training data, the analysis system is able to perform accurately with significantly less training data because the training process is decomposed based on the individual dimensions in the output. In particular, experimentation has shown that the analysis system is able to generalize well and return reasonably-high accuracy inferences even when trained with limited training data. For example, by focusing on a single dimension for each model, the models need not learn or consider the complex multidimensional interactions of the signals and space. This allows each dimension-specific model to generalize well with limited training. Further, by forcing generalization on individual dimensions, the resultant sub-networks (e.g., a subset of layers within a neural network model) or models may benefit from additional regularization, meaning that the trained weights are less likely to over fit the data.

For example, suppose the analysis system is configured to perform positioning for a space (e.g., the physical space 105) by outputting (x, y) coordinate pairs for any detected positioning targets at intervals or moments in time. In one embodiment, to train the analysis system, a user may be instructed to walk along a set of predefined paths in the space, recording their location (or having their location recorded) at one or more points in the path. A similar approach may be used to refine the models by asking or instructing the user to walk one or more additional paths in the space (e.g., when furniture is rearranged, or the RF characteristics of the space change). Notably, the training data need not rely on a human user moving about a space. Any controllable positioning target, such as a remote-controlled positioning target, could be used as a training reference. Further, in some spaces, such as outdoor spaces, a user may be operating a vehicle as the training reference. Similarly, in some aspects, the system may automatically collect training data by using cameras or other sensors to locate positioning targets and generate automatic labels (e.g., during training or refining periods).

In one training configuration, for a rectangular space, a set of paths may include one path along each edge in a room (e.g., walking along the perimeter of the room). This relatively limited set of paths encompass the space (e.g., a convex set of the sample space) for which predictions are to be made (bounding the prediction space), which enables the models to be trained to interpolate to cover the entire space (using basis decomposition). In contrast, a set of paths that does not (collectively) circumscribe the relevant space may be insufficient. For example, if the paths cover only one half of the room, the analysis system may be unable to generate accurate predictions for the remaining half that was not enclosed by the set of paths. In embodiments, the application of basis decomposition provides a systematic way to decompose a higher dimensional sample space (e.g., a three-dimensional room) into a full-rank decomposition of the principal basis while needing only minimal samples for the basis representation of the sample space. Thus, the decomposition provides better training performance and ultimately better model performance than conventional methods without needing to change the input or final output data dimensionality.

In some embodiments, the analysis system may also use additional paths to be used to supplement the training, such as walking from one wall to the opposite wall through the middle of the room. In at least one embodiment, the analysis system selects some or all of the training paths based on the output dimensions of the system. For example, referring to the physical space 105 in FIG. 1A or 1B, suppose the analysis system outputs two-dimensional coordinate pairs, where the first dimension is the horizontal axis (e.g., x-axis along the wall the Transceiver 110 is depicted on), while the second dimension is the vertical axis (e.g., y-axis). In one embodiment, the analysis system (e.g., via a training subsystem such as the training component 126) instructs the user to walk at predefined locations on each axis.

For example, a first set of paths may include walking horizontally across the room between the left and right walls at specific vertical intervals (e.g., at y=0, y=5, y=10, and so on). At each point along these paths, the user's location is a fixed value for one dimension (the y value) and varies along the other dimension (the x value). Additional paths can similarly be used for the other dimension(s). Additionally, in some embodiments, the suggested paths may vary across multiple dimensions (e.g., a diagonal path through the room).

Regardless of whether the signal data is collected along predefined (suggested) paths or along any path as the user or other physical positioning target is moved through the space, the analysis system uses the labeled data to train and refine its models.

Returning to FIG. 4, after labeled signal data is received, the method 400 continues to block 410. At block 410, the analysis system decomposes the data based on the label dimensions. That is, the analysis system delineates the data into separate training records, one for each dimension or basis in the output space, with corresponding portions of the label associated with each.

For example, suppose a training record is defined as (D, x, y), where D is the signal characteristics/signal data at a given time or interval, x is the label for one dimension, and y is the label for a second dimension. In an embodiment, partitioning the signal data includes generating a first training record (D, x) for one dimension and a second (D, y) for the other dimension. Note that in embodiments, the signal data (D) is not partitioned or decomposed, though the label is decomposed into its associated dimensions.

The method 400 then continues to block 415, where the analysis system selects a label dimension. That is, the analysis system selects one of the output dimensions, as indicated by the received label(s). In embodiments, this selection may be performed randomly, as the analysis system will iterate through each dimension to train or refine the model(s).

At block 420, the analysis system identifies the model that corresponds to the selected dimension. In some embodiments, rather than utilizing an entirely discrete dimension-specific model for each dimension, the analysis system uses dimension-specific portions of a model (e.g., one or more dimension-specific layers) in combination with one or more shared layers. In such an embodiment, the analysis system may first process the data using the shared layer(s), prior to selecting the dimension-specific layer(s).

The method 400 then continues to block 425, where the analysis system generates a dimension-specific inference using the identified (dimension-specific) basis model. To do so, the analysis system generally applies the received signal data D (or the output of any shared layers) as input to the selected model. The resulting output is a dimension-specific inference (also referred to as a dimension-specific prediction).

At block 430, the analysis system computes a dimension-specific loss or error based on the dimension-specific inference and the "ground truth" label of the signal data with respect to the selected dimension. The error generally indicates the difference between the predicted value for the dimension (e.g., the predicted y coordinate) and the actual value for the dimension (indicated by the label). In some embodiments, the error is alternatively referred to as loss.

The method 400 then proceeds to block 435, where the analysis system refines the dimension-specific machine learning model based on the dimension-specific error/loss. In one embodiment, this includes utilizing backpropagation to refine one or more internal weights, biases, or other parameters of the dimension-specific model. In this way, the model is iteratively trained to generate more accurate predictions for the particular dimension. In some embodiments, any shared layer(s) may also be refined in a similar manner.

At block 440, the analysis system determines whether there is at least one additional dimension that has not yet been trained using the received data. If so, the method 400 returns to block 415. In this way, the system iteratively trains the dimension-specific models for each dimension. Although illustrated as an iterative/sequential process, in some embodiments, the dimension-specific models are refined simultaneously (e.g., in parallel). Additionally, though depicted as refining the models for each individual data record (e.g., using stochastic gradient descent) for conceptual clarity, in some embodiments, the system refines the models based on batches of data (e.g., using batch gradient descent).

If no additional dimensions remain, the method 400 continues to block 445. At block 445, the analysis system stores the dimension-specific models for subsequent use at runtime (or for subsequent training). In embodiments, this training or refinement process may be repeated whenever one or more refinement criteria are satisfied, such as periodically (e.g., daily), whenever new data is available (e.g., whenever the user manually records new data), whenever the RF environment changes (e.g., because semi-static objects were rearranged), and the like.

In some embodiments, by using basis decomposition to delineate the training into individual dimensions, the analysis system is able to generalize and return accurate results using limited data. This allows for rapid refinement of the system. For example, when furniture or other objects are relocated in the space, a user can generate new training data relatively quickly (e.g., walking a limited set of paths, which may be suggested by the analysis system). The models can be refined using this limited data, allowing the analysis system to quickly respond to changes in the environment.

Moreover, in addition to reduced data requirements, the reduced training complexity (via basis decomposition) makes training faster and enables lower power devices and/or battery-operated devices (such as mobile devices, edge processing devices, and the like) to utilize aspects disclosed herein.

Figure 5:
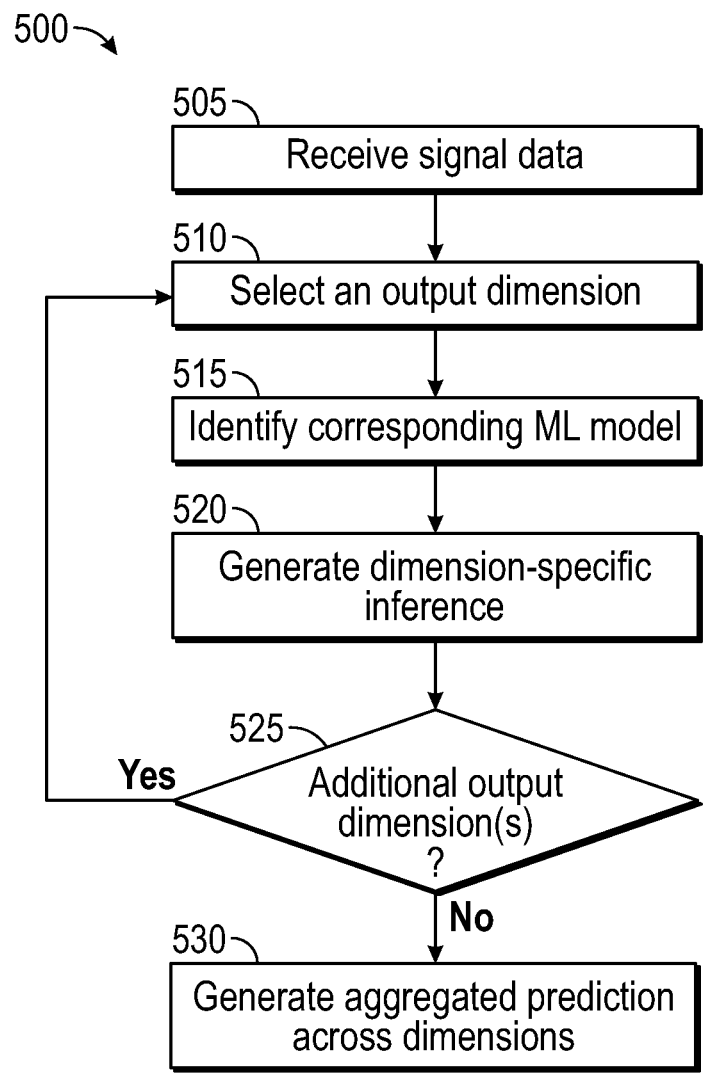
FIG. 5 depicts a flow diagram illustrating a method for applying trained machine learning models to generate inferences using basis decomposition, according to some embodiments disclosed herein.

Example Method for Generating Predictions Using Decomposed Machine Learning Models FIG. 5 depicts a flow diagram illustrating a method 500 for applying trained machine learning models to generate predictions using basis decomposition, according to some embodiments disclosed herein. In some embodiments, the method 500 is performed by an analysis system (e.g., analysis system 125). In other embodiments, the method 500 may be performed by other devices that use the models. The method 500 begins at block 505, where signal data is received by the system. As this data is received during runtime (e.g., in order to generate predictions), it does not have associated labels. In other words, given signal data D, the system will predict values for each dimension.

At block 510, the system selects one of the output dimensions used for the space. In embodiments, this selection may be performed randomly, as the system will iterate through each dimension to generate a corresponding prediction. The method 500 then continues to block 515.

At block 515, the system identifies the dimension-specific machine learning model that corresponds to the selected output dimension.

The method 500 then proceeds to block 520, where the system generates a dimension-specific prediction by processing the entirety of the received signal data using the identified machine learning model for the selected dimension. For example, if the system utilizes Cartesian coordinates and the selected dimension is the x dimension, the system generates a value for the x coordinate of the positioning target(s).

The method 500 then proceeds to block 525, where the system determines whether there is at least one additional output dimension for which a value has not yet been generated. If so, the method 500 returns to block 510. In this way, the system iteratively generates a dimension-specific prediction for each dimension. Although illustrated as an iterative/sequential process for conceptual clarity, in some embodiments, the dimension-specific predictions are generated simultaneously (e.g., in parallel).

If no additional dimensions remain, the method 500 continues to block 530, where the system generates an aggregated prediction for all the dimensions. In one embodiment, this includes concatenating the dimension-specific values. In other embodiments, this aggregation may include more complex aggregation.

This prediction is then returned as the predicted location of the positioning target(s) (e.g., a user in the space) at the moment or interval represented by the received signal data. By iteratively repeating this process for new signal data (e.g., collected periodically or continuously), the system can track the movement of positioning targets in the space. In other embodiments, each prediction may itself indicate movement (e.g., determined based on Doppler shift) of the positioning target(s).

Example Method for Training Decomposed Machine Learning Models

Figure 6:
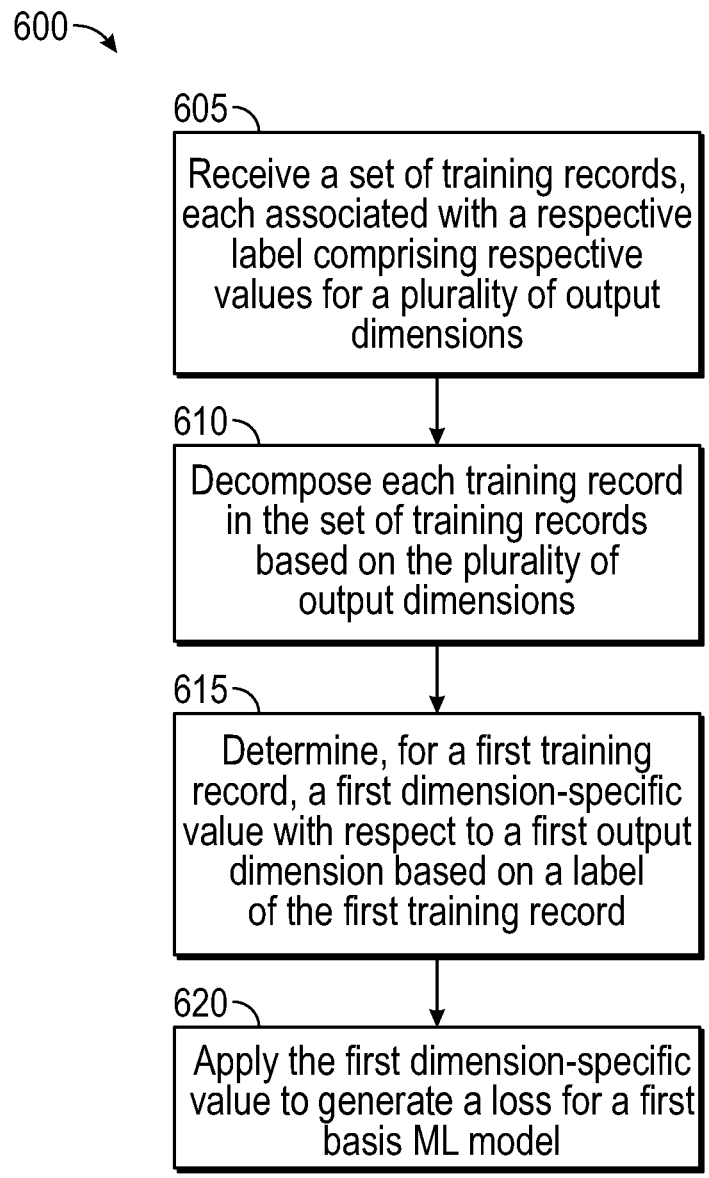
FIG. 6 depicts a flow diagram illustrating a method for training machine learning models using basis decomposition, according to some embodiments disclosed herein.

FIG. 6 depicts a flow diagram illustrating a method 600 for training machine learning models using basis decomposition, according to some embodiments disclosed herein. In one embodiment, the method 600 is performed by an analysis system, such as the analysis system 125 of FIGS. 1A and 1B. The method 600 begins at block 605, where an analysis system receives a set of training records, each associated with a respective label comprising respective values for a plurality of output dimensions.

At block 610, the analysis system decomposes each training record in the set of training records based on the plurality of output dimensions, such as shown FIG. 2. The method 600 then continues to block 615.

At block 615, the analysis system determines, for a first training record, a first dimension-specific value with respect to a first output dimension based on a label of the first training record. At block 620, the analysis system applies the first dimension-specific value to generate a loss for a first basis ML model. In some examples, the first decomposed ML model is specific to the first output dimension. The operations included in blocks 615 and 620 may be performed independently for each output dimension in order to train a plurality of decomposed ML models.

Example Method for Utilizing Decomposed Machine Learning Models

Figure 7:
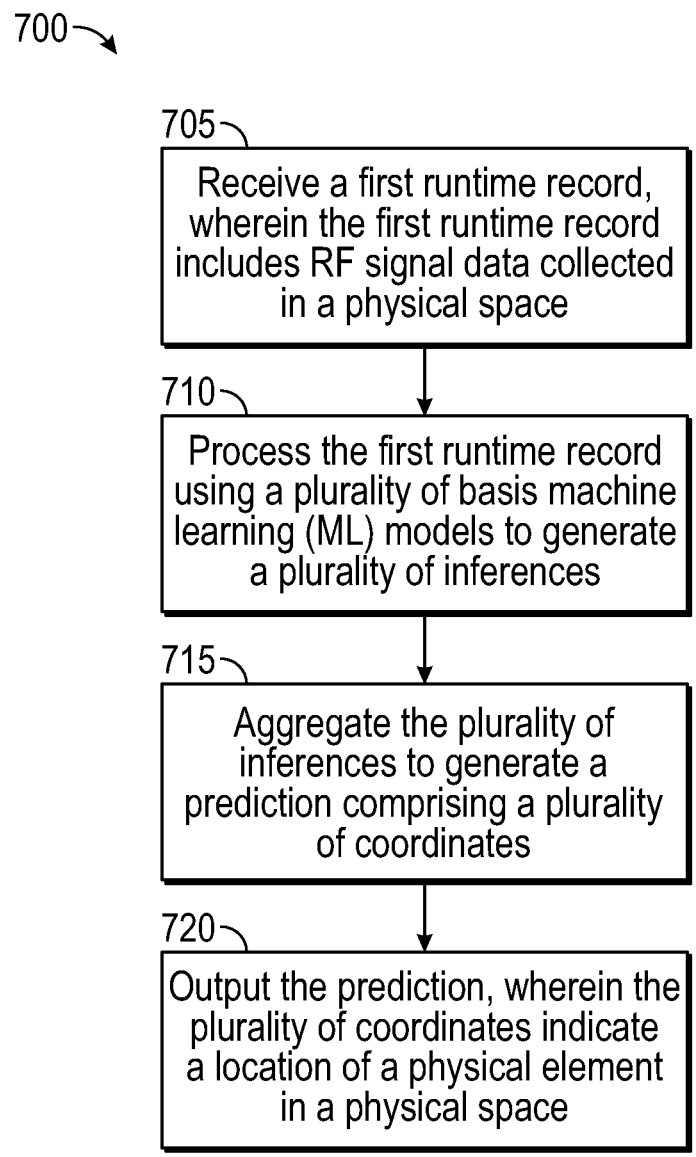
FIG. 7 depicts a flow diagram illustrating a method for utilizing machine learning models using basis decomposition, according to some embodiments disclosed herein.

FIG. 7 depicts a flow diagram illustrating a method 700 for utilizing machine learning models trained using basis decomposition, such as described with respect to FIG. 6. In one embodiment, the method 700 is performed by an analysis system, such as the analysis system 125.

The method 700 begins at block 705, where an analysis system receives a first runtime record. In some examples, the first runtime record includes RF signal data collected in a physical space.

At block 710, the analysis system processes the first runtime record using a plurality of basis machine learning models to generate a plurality of inferences.

The method 700 then continues to block 715, where the analysis system aggregates the plurality of inferences to generate a prediction comprising plurality of coordinates.

At block 720, the analysis system outputs the prediction. In some examples, the plurality of coordinates indicate a location of a physical element in a physical space.

Example System for Improved Machine Learning Using Basis Decomposition

In some embodiments, the methods described with respect to FIGS. 4-7 may be performed on one or more devices. For example, training and inferencing may be performed by a single device or distributed across multiple devices.

By way of example, the analysis system may be comprised within a wireless router (or wireless access point, such as a mesh access point) providing wireless connectivity in a space, where the router includes a wireless sensing module that receives the wireless channel state information as input in order to perform inferencing for positioning target localization in the space. In one such embodiment, the deep learning (or neural network) engine core may be in the form of a graphics processing unit (GPU), digital signal processor (DSP), central processing unit (CPU), a neural processing unit (NPU), or another type of processing unit or integrated circuit.

In some aspects, an inference engine may perform certain "on-line" learning or "continual" learning, such that a portion of the network weights may continue to be updated or adapted while inferencing is performed on test and/or live input data.

Figure 8:
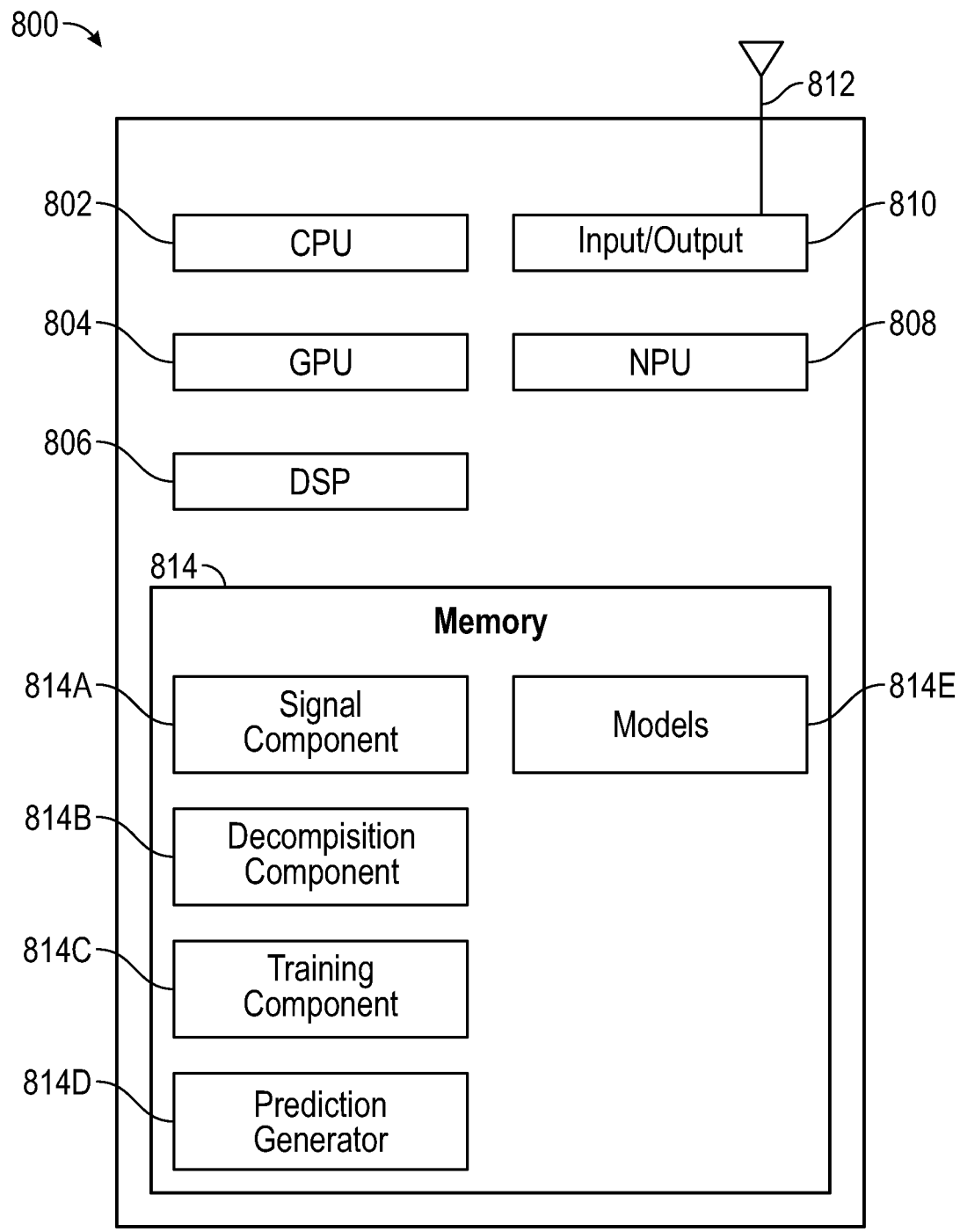
FIG. 8 depicts a block diagram illustrating a processing system configured to train and utilize machine learning models through basis decomposition, according to some embodiments disclosed herein.

FIG. 8 depicts a block diagram illustrating an analysis system 800, which may be configured to perform aspects of the various methods described herein, including, for example, the methods described with respect to FIGS. 4-7.

Analysis system 800 includes a CPU 802, which in some examples may be a multi-core CPU. Instructions executed at the CPU 802 may be loaded, for example, from a program memory associated with the CPU 802 or may be loaded from a memory 814.

Analysis system 800 also includes additional processing components tailored to specific functions, such as a GPU 804, a DSP 806, and an NPU 808.

Though not depicted in FIG. 8, NPU 808 may be implemented as a part of one or more of CPU 802, GPU 804, and/or DSP 806.

The analysis system 800 also includes input/output 810. In the illustrated embodiment, the input/output 810 is communicatively coupled with an antenna 812. For example, the input/output 810 may be coupled with a transmitter, receiver, and/or transceiver (e.g., transmitter 135, receiver 140, and/or transceiver 110) in order to receive signal data. In embodiments, the transmitted, receiver, and/or transceiver may be part of the analysis system 800, or may be separate components or devices.

Although not included in the illustrated embodiment, the analysis system 800 may also include one or more input and/or output devices, such as screens, physical buttons, speakers, microphones, and the like.

Analysis system 800 also includes memory 814, which is representative of one or more static and/or dynamic memories, such as a dynamic random access memory, a flash-based static memory, and the like. In this example, memory 814 includes computer-executable components, which may be executed by one or more of the aforementioned processors of analysis system 800.

In this example, memory 814 includes a signal component 814A, a decomposition component 814B, a training component 814C, and a prediction generator 814D. The depicted components, and others not depicted, may be configured to perform various aspects of the methods described herein. For example, the signal component 814A may be configured to receive and pre-process signal data for one or more physical spaces in order to prepare it for training or inferencing.

The decomposition component 814B may decompose training records based on the output dimensions for the system, and the training component 814C may train the set of dimension-specific models 814E. A separate model 814E may be maintained for each individual dimension. In an embodiment, the prediction generator 814D processes newly-received signal data to generate predictions using the models 814E.

Example Clauses

Clause 1: A method comprising: receiving a set of training records, each associated with a respective label comprising respective values for a plurality of output dimensions; decomposing each training record in the set of training records based on the plurality of output dimensions; and training a plurality of basis machine learning (ML) models based on the decomposed training records, comprising, for each respective output dimension of the plurality of output dimensions: determining, for a first training record, a respective dimension-specific value with respect to the respective output dimension based on a label of the first training record; and applying the respective dimension-specific value to generate a respective loss for a respective basis ML model of the plurality of basis ML models, wherein the respective basis ML model is specific to the respective output dimension.

Clause 2: The method of Clause 1, wherein: each respective output dimension of the plurality of output dimensions corresponds to a respective coordinate of a plurality of coordinates, the plurality of coordinates identify locations in a physical space, and the plurality of coordinates correspond to a Cartesian coordinate system or a polar coordinate system.

Clause 3: The method of any one of Clauses 1-2, wherein the set of training records comprise signal data indicating characteristics of radio frequency (RF) signals in the physical space, wherein the characteristics are a result of at least one of: RF fading, RF reflection, RF refraction, RF scattering, or RF attenuation.

Clause 4: The method of any one of Clauses 1-3, wherein the characteristics of the RF signals are determined based at least in part on signal strength of the RF signals, and wherein the set of training records is used to train the plurality of basis ML models to track locations of dynamic elements in the physical space.

Clause 5: The method of any one of Clauses 1-4, wherein training the plurality of basis ML models further comprises, for each respective output dimension of the plurality of output dimensions: providing the first training record as input to the respective basis ML model to generate a respective dimension-specific inference for the first training record with respect to the respective output dimension; computing a respective dimension-specific error for the first training record with respect to the respective output dimension based on the respective dimension-specific inference and the respective dimension-specific value; and refining the respective basis ML model using backpropagation of the respective dimension-specific error.

Clause 6: The method of any one of Clauses 1-5, wherein training the plurality of basis ML models comprises: training a first portion of a first ML model based on all of the plurality of output dimensions; and for each respective output dimension of the plurality of output dimensions, training a respective second portion of the first ML model to generate predictions only for the respective output dimension.

Clause 7: The method of any one of Clauses 1-6, wherein the first portion of the first ML model comprises one or more layers of a deep neural network.

Clause 8: The method of any one of Clauses 1-7, the method further comprising: receiving a set of updated training records corresponding to a first output dimension of the plurality of output dimensions, wherein the set of updated training records were collected while a physical element moved only in the first output dimension; and refining a first basis ML model of the plurality of basis ML models based on the set of updated training records, wherein the first basis ML model is trained to generate predictions only for the first output dimension.

Clause 9: The method of any one of Clauses 1-8, the method further comprising: receiving a set of updated training records that were collected while a physical element moved around a perimeter of a physical space; and refining the plurality of basis ML models based on the set of updated training records.

Clause 10: The method of any one of Clauses 1-9, wherein the set of updated training records were received responsive to a transmitting a request for additional data, wherein the request instructed that the additional data be collected while a positioning target moved around the perimeter of the physical space.

Clause 11: A comprising: receiving a first runtime record, wherein the first runtime record includes RF signal data collected in a physical space; processing the first runtime record using a plurality of basis machine learning (ML) models to generate a plurality of inferences; aggregating the plurality of inferences to generate a prediction comprising a plurality of coordinates; and outputting the prediction, wherein the plurality of coordinates indicate a location of a physical element in a physical space.

Clause 12: The method of Clause 11, wherein processing the first runtime record using the plurality of basis ML models comprises, for each respective basis ML model of the plurality of basis ML models: generating a respective coordinate of the plurality of coordinates by providing an entirety of the first runtime record as input to the respective basis ML model.

Clause 13: The method of any one of Clauses 11-12, wherein each respective basis ML model of the plurality of basis ML models was trained to generate inferences only for a respective output dimension.

Clause 14: The method of any one of Clauses 11-13, further comprising: receiving a sequence of runtime records; generating a sequence of inferences by processing the sequence of runtime records using the plurality of basis ML models; and tracking movement of the physical element over time based on the sequence of inferences.

Clause 15: The method of any one of Clauses 11-14, wherein receiving the first runtime record comprises: transmitting RF signals in the physical space using a transmitter; and receiving composite results of one or more of: fading, reflecting, attenuation, or refracting of the RF signals in the physical space.

Clause 16: The method of any one of Clauses 11-15, further comprising: receiving a first training record associated with a first label comprising respective values for each of the plurality of coordinates; decomposing the first training record based on the plurality of coordinates; and refining the plurality of basis ML models based on the decomposed training record.

Clause 17: The method of any one of Clauses 11-16, wherein refining the plurality of basis ML models comprises, for each respective coordinate of the plurality of coordinates: determining a respective dimension-specific value with respect to the respective coordinate based on first the label; and applying the respective dimension-specific value to generate a respective loss for a respective basis ML model of the plurality of basis ML models, wherein the respective basis ML model is specific to the respective coordinate.

Clause 18: The method of any one of Clauses 11-17, wherein refining the plurality of basis ML models comprises: training a first portion of a first ML model based on all of the plurality of coordinates; and for each respective coordinate of the plurality of coordinates, training a respective second portion of the first ML model to generate predictions only for the respective coordinate.

Clause 19: The method of any one of Clauses 11-18, further comprising, upon determining that one or more refinement criteria are satisfied, initiating the refinement of the plurality of basis ML models.

Clause 20: The method of any one of Clauses 11-19, wherein the one or more refinement criteria comprise determining that one or more objects in the physical space are in a new location.

Clause 21: A system, comprising: a memory comprising computer-executable instructions; and one or more processors configured to execute the computer-executable instructions and cause the processing system to perform a method in accordance with any one of Clauses 1-20.

Clause 22: A system, comprising means for performing a method in accordance with any one of Clauses 1-20.

Clause 23: A non-transitory computer-readable medium comprising computer-executable instructions that, when executed by one or more processors of a processing system, cause the processing system to perform a method in accordance with any one of Clauses 1-20.

Clause 24: A computer program product embodied on a computer-readable storage medium comprising code for performing a method in accordance with any one of Clauses 1-20.

Additional Considerations

The preceding description is provided to enable any person skilled in the art to practice the various embodiments described herein. The examples discussed herein are not limiting of the scope, applicability, or embodiments set forth in the claims. Various modifications to these embodiments will be readily apparent to those skilled in the art, and the generic principles defined herein may be applied to other embodiments. For example, changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method that is practiced using other structure, functionality, or structure and functionality in addition to, or other than, the various aspects of the disclosure set forth herein. It should be understood that any aspect of the disclosure disclosed herein may be embodied by one or more elements of a claim.

As used herein, the word "exemplary" means "serving as an example, instance, or illustration." Any aspect described herein as "exemplary" is not necessarily to be construed as preferred or advantageous over other aspects.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims. Further, the various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The following claims are not intended to be limited to the embodiments shown herein, but are to be accorded the full scope consistent with the language of the claims. Within a claim, reference to an element in the singular is not intended to mean "one and only one" unless specifically so stated, but rather "one or more." Unless specifically stated otherwise, the term "some" refers to one or more. No claim element is to be construed under the provisions of 35 U.S.C. § 112(f) unless the element is expressly recited using the phrase "means for" or, in the case of a method claim, the element is recited using the phrase "step for." All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method, comprising:
   receiving a first runtime record, wherein the first runtime record includes radio frequency (RF) signal data collected in a physical space, wherein the RF signal data comprises characteristics of interactions by one or more RF signals with a physical element in the physical space;
   processing the first runtime record using a machine learning (ML) model, comprising:
   processing the first runtime record using a shared portion of the ML model to generate a set of features, wherein the shared portion is shared by a plurality of basis components of the ML model; and
   processing the set of features using the plurality of basis components of the ML model to generate a plurality of inferences;
   aggregating the plurality of inferences to generate a prediction comprising a plurality of coordinates; and
   outputting the prediction, wherein the plurality of coordinates indicates a location of the physical element in a physical space and wherein the physical element is an RF passive physical element.

2. The method of claim 1, wherein processing the first runtime record using the plurality of basis components comprises, for each respective basis component of the plurality of basis components:
   generating a respective coordinate of the plurality of coordinates by providing an entirety of the first runtime record as input to the respective basis component.

3. The method of claim 2, wherein each respective basis component of the plurality of basis components was trained to generate inferences only for a respective output dimension.

4. The method of claim 1, further comprising:
   receiving a sequence of runtime records;
   generating a sequence of inferences by processing the sequence of runtime records using the ML model; and
   tracking movement of the physical element over time based on the sequence of inferences.

5. The method of claim 1, wherein receiving the first runtime record comprises:
   transmitting the one or more RF signals in the physical space using a transmitter; and
   receiving the composite characteristics, wherein the characteristics comprise one or more of: fading, reflecting, attenuation, or refracting of the one or more RF signals in the physical space.

6. The method of claim 1, further comprising:
   receiving a first training record associated with a first label comprising respective values for each of the plurality of coordinates;
   decomposing the first training record based on the plurality of coordinates; and
   refining the ML model based on the decomposed training record.

7. The method of claim 6, wherein refining the ML model comprises, for each respective coordinate of the plurality of coordinates:
   determining a respective dimension-specific value with respect to the respective coordinate based on the first label; and
   generating a respective loss, based on the respective dimension-specific value, for a respective basis component of the plurality of basis components, wherein the respective basis component is specific to the respective coordinate.

8. The method of claim 6, wherein refining the ML model comprises:
   training the shared portion based on all of the plurality of coordinates; and
   for each respective coordinate of the plurality of coordinates, training a respective basis component of the plurality of basis components to generate predictions only for the respective coordinate.

9. The method of claim 6, further comprising, upon determining that one or more refinement criteria are satisfied, initiating the refinement of the ML model.

10. The method of claim 9, wherein the one or more refinement criteria comprise determining that one or more objects in the physical space are in a new location.

11. A device, comprising:
    a memory comprising computer-executable instructions; and
    one or more processors configured to execute the computer-executable instructions and cause the device to perform an operation comprising:
    receiving a first runtime record, wherein the first runtime record includes radio frequency (RF) signal data collected in a physical space, wherein the RF signal data comprises characteristics of interactions by one or more RF signals with a physical element in the physical space;
    processing the first runtime record using a machine learning (ML) model, comprising:
    processing the first runtime record using a shared portion of the ML model to generate a set of features, wherein the shared portion is shared by a plurality of basis components of the ML model; and processing the set of features using the plurality of basis components of the ML model to generate a plurality of inferences;

aggregating the plurality of inferences to generate a plurality of coordinates; and outputting the plurality of coordinates, wherein the plurality of coordinates indicate a location of a physical element in a physical space and wherein the physical element is an RF passive physical element.

12. The device of claim 11, wherein processing the first runtime record using the plurality of basis components comprises, for each respective basis component of the plurality of basis components:

generating a respective coordinate of the plurality of coordinates by providing an entirety of the first runtime record as input to the respective basis component.

13. The device of claim 12, wherein each respective basis component of the plurality of basis components was trained to generate inferences only for a respective output dimension.

14. The device of claim 11, the operation further comprising:

receiving a sequence of runtime records;

generating a sequence of inferences by processing the sequence of runtime records using the ML model; and tracking movement of the physical element over time based on the sequence of inferences.

15. The device of claim 11, wherein receiving the first runtime record comprises:

transmitting the one or more RF signals in the physical space using a transmitter; and receiving the composite characteristics, wherein the characteristics comprise one or more of: fading, reflecting, attenuation, or refracting of the one or more RF signals in the physical space.

16. The device of claim 11, the operation further comprising:

receiving a first training record associated with a first label comprising respective values for each of the plurality of coordinates;

decomposing the first training record based on the plurality of coordinates; and refining the ML model based on the decomposed training record.

17. The device of claim 16, wherein refining the plurality of basis ML models comprises, for each respective coordinate of the plurality of coordinates:

determining a respective dimension-specific value with respect to the respective coordinate based on the first label; and applying the respective dimension-specific value to generate a respective loss for a respective basis ML model of the plurality of basis ML models, wherein the respective basis ML model is specific to the respective coordinate.

18. The device of claim 16, wherein refining the ML model comprises:

training the shared portion based on all of the plurality of coordinates; and for each respective coordinate of the plurality of coordinates, training a respective basis component of the plurality of basis components to generate predictions only for the respective coordinate.

19. The device of claim 16, the operation further comprising, upon determining that one or more refinement criteria are satisfied, initiating the refinement of the ML model.

20. The device of claim 19, wherein the one or more refinement criteria comprise determining that one or more objects in the physical space are in a new location.

21. A method, comprising:

receiving a set of training records comprising at least a first training record, each associated with a respective label comprising respective values for a plurality of output dimensions, wherein the first runtime record comprises characteristics of interactions by one or more RF signals with a physical element in a physical space, and wherein the physical element is an RF passive physical element;

generating a first decomposed training record based on decomposing the first training record based on the plurality of output dimensions; and training a machine learning (ML) model based on the first decomposed training record, comprising, for each respective output dimension of the plurality of output dimensions:

generating a respective loss, based on the first decomposed training record, for a respective basis component of a plurality of basis components of the ML model, wherein the respective basis component is specific to the respective output dimension;

updating one or more parameters of the respective basis component based on the respective loss; and updating one or more parameters of a shared portion of the ML model based on the respective loss, wherein the shared portion is shared by the plurality of basis components and wherein the physical element is RF passive and does not transmit or process RF signals.

22. The method of claim 21, wherein:

each respective output dimension of the plurality of output dimensions corresponds to a respective coordinate of a plurality of coordinates, the plurality of coordinates identify locations in the physical space, and the plurality of coordinates correspond to a Cartesian coordinate system or a polar coordinate system.

23. The method of claim 22, wherein the set of training records comprises signal data indicating characteristics of radio frequency (RF) signals in the physical space, wherein the characteristics are a result of at least one of: RF fading, RF reflection, RF refraction, RF scattering, or RF attenuation.

24. The method of claim 23, wherein the characteristics of the RF signals are determined based at least in part on signal strength of the RF signals, and wherein the set of training records is used to train the ML model to track locations of dynamic elements in the physical space.

25. The method of claim 21, wherein training the ML model further comprises, for each respective output dimension of the plurality of output dimensions:

providing the first training record as input to the respective basis component to generate a respective dimension-specific inference for the first training record with respect to the respective output dimension;

computing a respective dimension-specific error for the first training record with respect to the respective output dimension based on the respective dimension-specific inference and the respective dimension-specific value; and refining the respective basis component using backpropagation of the respective dimension-specific error.

26. The method of claim 21, wherein training the ML model comprises:
   training the shared portion based on all of the plurality of output dimensions; and
   for each respective output dimension of the plurality of output dimensions, training a respective basis component of the plurality of basis components to generate predictions only for the respective output dimension.

27. The method of claim 26, wherein the shared portion comprises one or more layers of a deep neural network.

28. The method of claim 21, the method further comprising:
   receiving a set of updated training records corresponding to a first output dimension of the plurality of output dimensions, wherein the set of updated training records was collected while the physical element moved only in the first output dimension; and
   refining a first basis component of the plurality of basis components based on the set of updated training records, wherein the first basis component is trained to generate predictions only for the first output dimension.

29. The method of claim 21, the method further comprising:
   receiving a set of updated training records that were collected while the physical element moved around a perimeter of the physical space; and
   refining the ML model based on the set of updated training records.

30. The method of claim 29, wherein the set of updated training records was received responsive to a transmitting a request for additional data, wherein the request instructed that the additional data be collected while a positioning target moved around the perimeter of the physical space.

* * * * *